United States Patent
Lee et al.

(10) Patent No.: US 7,626,652 B2
(45) Date of Patent: Dec. 1, 2009

(54) BACKLIGHT MODULE AND LIQUID CRYSTAL DISPLAY DEVICE INCORPORATING THE SAME

(75) Inventors: Kuo-Chih Lee, Sinhua Township, Tainan County (TW); Yi-Chun Lin, Hsinchu (TW); Sheng-Jie Chen, Tanzih Township, Taichung County (TW); Huang-De Lin, Banciao (TW)

(73) Assignee: Au Optronics Corp., Hsinchu (TW)

( * ) Notice: Subject to any disclaimer, the term of this patent is extended or adjusted under 35 U.S.C. 154(b) by 364 days.

(21) Appl. No.: 11/314,858

(22) Filed: Dec. 20, 2005

(65) Prior Publication Data
US 2007/0081356 A1 Apr. 12, 2007

(30) Foreign Application Priority Data
Oct. 6, 2005 (TW) .............................. 94135000 A

(51) Int. Cl.
*G02F 1/1335* (2006.01)
*G02F 1/1333* (2006.01)
*F21V 7/04* (2006.01)

(52) U.S. Cl. ........................... 349/58; 349/61; 362/630; 362/632

(58) Field of Classification Search ................... 349/58, 349/61; 362/630, 632
See application file for complete search history.

(56) References Cited

U.S. PATENT DOCUMENTS

| 5,895,106 | A  | * | 4/1999 | VanderPloeg et al. | 349/120 |
| 6,441,874 | B1 | * | 8/2002 | Saito et al. | 349/70 |
| 2003/0123243 | A1 | | 7/2003 | Eiraku et al. | 362/26 |
| 2004/0080925 | A1 | | 4/2004 | Moon | 362/29 |
| 2004/0113631 | A1 | | 6/2004 | Hyeon-Yong | 324/510 |
| 2004/0165124 | A1 | * | 8/2004 | Yu et al. | 349/61 |
| 2005/0116607 | A1 | | 6/2005 | Park et al. | 313/485 |
| 2006/0103774 | A1 | * | 5/2006 | Han et al. | 349/58 |

FOREIGN PATENT DOCUMENTS

| CN | 1645213 | 7/2007 |
| JP | 2004220980 | 8/2004 |
| TW | 583445 | 4/2004 |

* cited by examiner

*Primary Examiner*—Michael H Caley
(74) *Attorney, Agent, or Firm*—Thomas, Kayden, Horstemeyer & Risley

(57) ABSTRACT

A backlight module and a liquid crystal display (LCD) device incorporating the same are provided. The backlight module includes a frame and at least a light source. The frame has at least a through aperture. The light source having at least a t high voltage electrode terminal is disposed above the frame. The high voltage electrode terminal is positioned above the through aperture.

12 Claims, 5 Drawing Sheets

BACKLIGHT MODULE AND LIQUID CRYSTAL DISPLAY DEVICE INCORPORATING THE SAME

This application claims the benefit of Taiwan application Serial No. 94135000, filed Oct. 6, 2005, the subject matter of which is incorporated herein by reference.

BACKGROUND OF THE INVENTION

1. Field of the Invention

The invention relates in general to a backlight module and a liquid crystal display (LCD) device incorporating the same, and more particularly to a backlight module and a liquid crystal display (LCD) device incorporating the same capable of reducing the leakage current between the light source and the frame.

2. Description of the Related Art

Along with the advance in the manufacturing technology of liquid crystal display (LCD) device devices and further due to the features of slimness, lightweight, low energy consumption and no radiation, LCD devices have been widely applied in various electronic products such as personal digital assistant (PDA), notebook computer, digital camera, digital video recorder, mobile phone, computer monitor, and liquid crystal TV. And further with large amount of input in research and development and the adoption of large-scaled production facilities, the quality of LCD devices continue to increase yet the prices keep falling down. Consequently, the application of LCD devices grows wider and wider. However, the LCD panel of an LCD device is a not a self-luminous display panel, and can not display without being availed by the light provided by a backlight module.

The backlight module can be categorized into side-type backlight module and direct-type backlight module according to the position of the light source in the backlight module. In the side-type backlight module, the cold cathode fluorescent lamp (CCFL) is disposed in a lateral side of the LCD panel. The light emitted by the CCFL is transmitted towards a light guide plate disposed at the rear of the LCD panel, so that the incident light is spread by the light guide plate.

Conventional direct-type backlight module includes a frame, a reflector, a number of CCFLs, a diffuser and an optical film. An accommodation recess is formed on the top surface of the frame. The reflector is disposed on the bottom and the wall of the accommodation recess. The CCFLs are arranged in the accommodation recess and positioned above the reflector. The diffuser is disposed above the CCFLs. The optical film module is disposed above the diffuser. The optical film includes a prism, a diffuser or a brightness enhancement film. When assembled with the direct-type backlight module, the LCD panel is disposed above the optical film.

The conventional direct-type backlight module is exemplified by the two-terminal driven mode. The lamp inverter needs to apply a high voltage to the electrode terminal at the two ends of the lamp, so that an expected lamp current is provided for the lamp to illuminate. For example, the lamp inverter respectively provides +1 kv and −1 kv to the two electrode terminals of the lamp. Therefore, the light emitted by the lamp is directly projected onto the LCD panel after having subsequently gone through the optical processing of the reflective plate, the diffuser, and the optical film.

However, the frame is normally a metal conductor, so parasitic capacitance or stray capacitance would occur between the electrode terminal of the lamp and the frame when a high voltage is applied to the lamp. Part of the lamp current provided to the lamp by the lamp inverter would be leaked to the frame, resulting in the so-called "leakage current" and reducing the luminance efficiency of the backlight module. Since the lamp current received by the lamp is smaller than the expected lamp current, so the luminance efficiency of the lamp will be weakened. Thus, the luminance quality of the backlight module is severely affected, largely reducing the practicality of the LCD device.

SUMMARY OF THE INVENTION

It is therefore an object of the invention to provide a backlight module and a liquid crystal display (LCD) device incorporating the same. The design of hollowing the overlapped region of the frame overlapped by the high high voltage electrode terminal of the light source to form a through aperture reduces the parasitic capacitance between the high voltage electrode terminal of the light source and the frame as well as the leakage current between the high voltage electrode terminal of the light source and the frame. The design not only increases the luminance efficiency of the light source, but also increases the stability of the voltage of the light source provided by lamp inverter. Thus, the luminance quality of the backlight module is enhanced, and the practicality of the application of the LCD device of the backlight module is largely increased.

The invention achieves the above-identified object by providing a backlight module including a frame and at least a light source. The frame has at least a through aperture. The light source is disposed above the frame and has at least a high voltage electrode terminal. The high voltage electrode terminal is positioned above the through aperture.

The invention achieves the above-identified object by providing another LCD device including a backlight module, two polarizers, and an LCD panel. The backlight module includes a frame and at least a light source. The frame has at least a through aperture. The light source is disposed above the frame and has at least a high voltage electrode terminal. The high voltage electrode terminal is positioned above the through aperture. The two polarizers are disposed above the backlight module. The LCD panel is disposed between the two polarizers.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
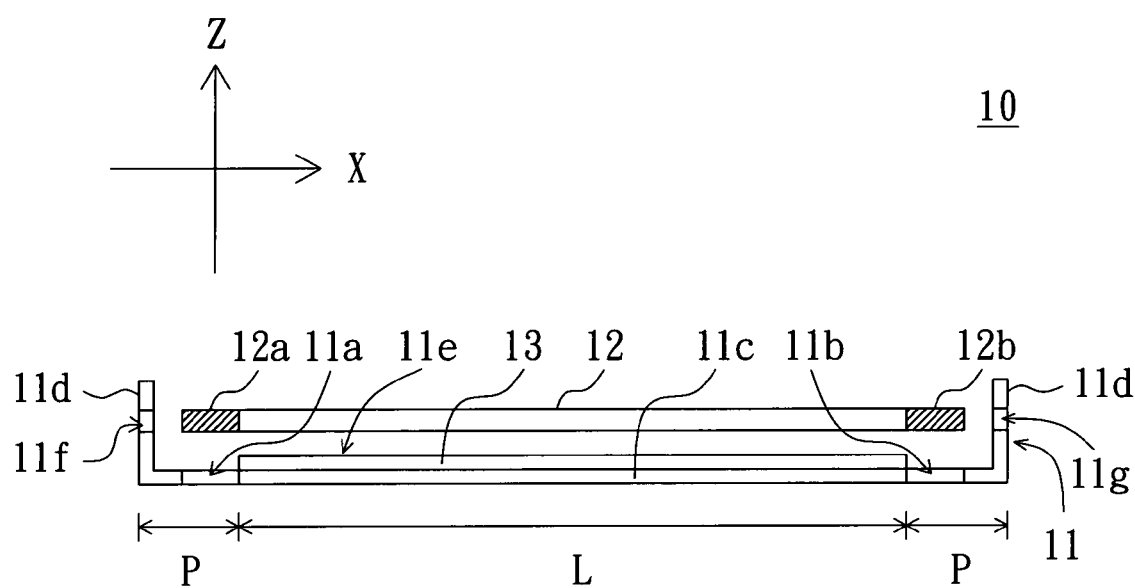
FIG. 1 is a cross-sectional view of partial structure of a backlight module according to a preferred embodiment of the invention.

For the leakage current Is between the high voltage electrode terminal of the light source and the frame to be reduced, the formulas of the leakage current Is and the parasitic capacitance Cs need to be examined first. Firstly, according to the formula of the leakage current Is which is expressed as: Is=2πf*Cs*VL, where the leakage current Isis proportional to the AC voltage frequency f that the lamp inverter provides to the high voltage electrode terminal of the light source, the parasitic capacitance Cs between the high voltage electrode terminal of the light source and the frame, and the voltage VL that the lamp inverter provides to the high voltage electrode terminal of the light source. Next, according to the formulas of the parasitic capacitance Cs which is expressed as: Cs=ϵ*S/d, where the parasitic capacitance Cs between the high voltage electrode terminal of the light source and the frame is proportional to the dielectric coefficient ϵ of the substance disposed between the high voltage electrode terminal of the light source and the frame, and the area S of the overlapped region between the high voltage electrode terminal of the light source and the frame; but is inversely proportional to the distance d between the high voltage electrode terminal of the light source and the frame.

It can be seen from the formulas of the leakage current Is and the parasitic capacitance Cs that for decreasing the leakage current Is between the high voltage electrode terminal of the light source and the frame, at least one of the AC voltage frequency f, the parasitic capacitance Cs and the voltage VL needs to be reduced.

After the AC voltage frequency f is reduced, the leakage current Is between the high voltage electrode terminal of the light source and the frame can be reduced. However, the AC voltage frequency f must be incorporated with the LCD device and the frame display must be normal.

The voltage VL has much to do with the characteristics of the light source such as a CCFL for instance. The longer or the narrower the light source, such as a CCFL for instance, is, the higher the voltage VL needs to be. The specification of current light source, such as a CCFL for instance, is subject to certain restrictions of design, therefore a new type of light source needs to be developed if the leakage current Is between the electrode terminal of the light source and the frame is to be reduced by reducing the voltage VL.

If the parasitic capacitance Cs between the high voltage electrode terminal of the light source and the frame is to be reduced, then the area S of the overlapped region between the high voltage electrode terminal of the light source and the frame needs to be reduced or the distance d between the high voltage electrode terminal of the light source and the frame needs to be increased.

Despite the parasitic capacitance Cs between the high voltage electrode terminal of the light source and the frame can be reduced by increasing the distance between the high voltage electrode terminal of the light source and the frame, however, both the thickness and the volume of the backlight module are increased. This is against the current trend of slimness, lightweight, and compactness of the backlight module incorporating LCD device.

Therefore, in the present embodiment, the overlapped region of the frame overlapped by the high voltage electrode terminal of the light source is hollowed to form a through aperture, so that the high voltage electrode terminal of the light source is corresponding to the through aperture and positioned above the through aperture.

The design of reducing the area S of the overlapped region between the high voltage electrode terminal of the light source and the frame is capable of reducing the parasitic capacitance Cs between the high voltage electrode terminal of the light source and the frame as well as the leakage current Is between the high voltage electrode terminal of the light source and the frame. The design not only increases the luminance efficiency of the light source, but also increases the stability of the voltage of the light source provided by lamp inverter. Thus, the luminance quality of the backlight module is enhanced, and the practicality of the application of the LCD device of the backlight module is largely increased.

The backlight module and a liquid crystal display (LCD) device incorporating the same of the present embodiment are exemplified below. However, the technology of the present embodiment of the invention is not limited thereto.

Referring to FIG. 1, a cross-sectional view of partial structure of a backlight module according to a preferred embodiment of the invention is shown. As shown in FIG. 1, the backlight module 10 includes a frame 11 and and at least a light source 12. The frame 11 has at least a through aperture 11a. The light source 12 is disposed above the frame 11 and has at least a high voltage electrode terminal 12a. The high voltage electrode terminal 12a is positioned above the through aperture 11a.

In the present embodiment, the light source 12 further has another high voltage electrode terminal 12b opposite to the high voltage electrode terminal 12a, and the frame 11 further has another through aperture 11b. The high voltage electrode terminal 12b is positioned above the through aperture 11b. Besides if the light source 12 further has a grounded electrode terminal opposite to the high voltage electrode terminal 12a, not the high voltage electrode terminal 12b, then part of the region of the frame 11 positioned under the grounded electrode terminal can be hollowed or unhallowed to form the through aperture 12b. No matter where the high voltage electrode terminals 12a and 12b of the light source 12 are positioned on the frame 11, the present embodiment can hollow part of the region of the frame 11 positioned under the high voltage electrode terminals 12a and 12b of the light source 12 to form the through apertures 11a and 11b.

In the present embodiment, the frame 11 further has a bottom plate 11c and a side plate 11d. The side plate 11d is connected to two sides of the bottom plate 11c. The bottom plate 11c and the side plate 11d form an accommodation recess 11e. The bottom plate 11c and the side plate 11d can be integrally formed in one piece. The light source 12 is positioned inside the accommodation recess 11e and is positioned above the bottom plate 11c. plate 11c. The bottom plate 11c has a central region L and a marginal region P. The marginal region P is positioned at the two sides of the central region P and has the through apertures 11a and 11b. Furthermore, the backlight module 10 further includes a reflector 13. The reflector 13 is disposed on the central region P of the bottom plate 11c and is positioned under the light source 11. The reflector 13 is positioned inside the accommodation recess 11e and is coated or adhered to be disposed on the central region P of the bottom plate 11c for reflecting the light. Moreover, the side plate 11d further has two through apertures 11f and 11g. The through aperture 11f corresponds to the high voltage electrode terminal 12a to be positioned to the left of the high voltage electrode terminal 12a. The through aperture 11g corresponds to the high voltage electrode terminal 12b to be positioned to the right of the high voltage electrode terminal 12b. By doing so, the overlapped region between the high voltage electrode terminals 12a and 12b of the light source 12 and the frame 11 can be further reduced.

No matter where the high voltage electrode terminals 12a and 12b of the light source 12 are positioned on the frame 11, the present embodiment can hollow part of the region of the frame 11 positioned under the high voltage electrode terminal 12a of the light source 12 and part of the bottom plate 11c positioned to the left of the high voltage electrode terminal 12a of the light source 12 to form the through apertures 11a and 11f respectively. Moreover, the present embodiment can hollow part of the region of the frame 11 positioned under the high voltage electrode terminal 12b of the light source 12 12 and part of the region of the side plate 11d positioned to the right of the high voltage electrode terminal 12b of the light source 12 to form the through apertures 11b and 11g respectively.

The above light source 12 can be a linear light source or a flat light source. The linear light source can be an external electrode fluorescent lamp (EEFL), a cold cathode fluorescent lamp (CCFL) or any fluorescent lamp that needs to be driven by a high voltage. The flat light source can be a cold cathode flat fluorescent lamp (CCFFL) or any flat fluorescent lamp that needs to be driven by a high voltage. In the present embodiment, the two high voltage electrode terminals 12a and 12b of the light source 12 correspond to two sides of the bottom plate 11c of the frame 11. However, the two high voltage electrode terminals of the light source, or one high voltage electrode terminal and one grounded electrode terminal of the light source according to the present embodiment, can correspond to the same side with the bottom plate 11c of the frame 11 and the same side with the side plate 11d of the frame 11.

Figure 2A:
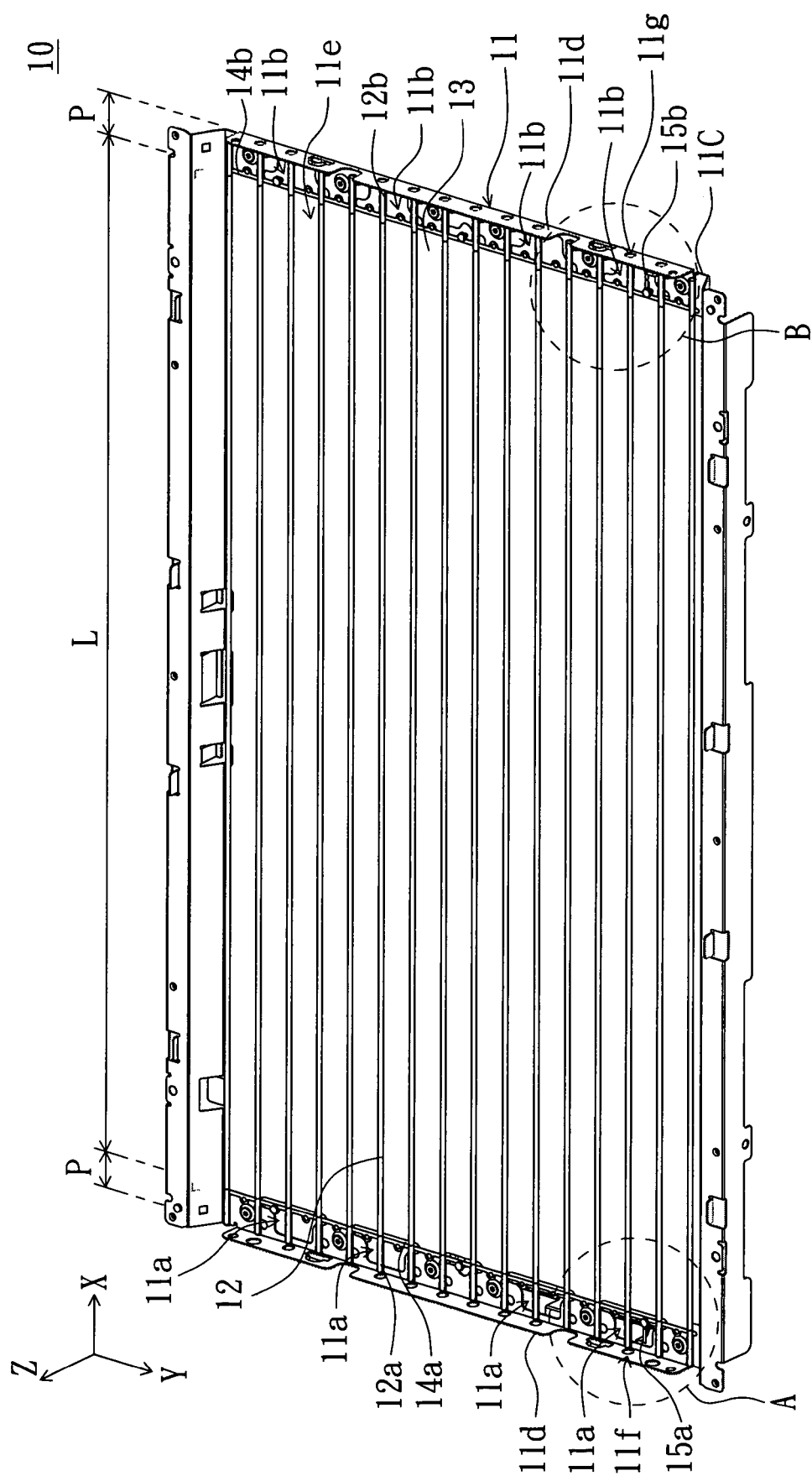
FIG. 2A is an enlarged 3-D top view of a backlight module of FIG. 1.
Figure 2B:
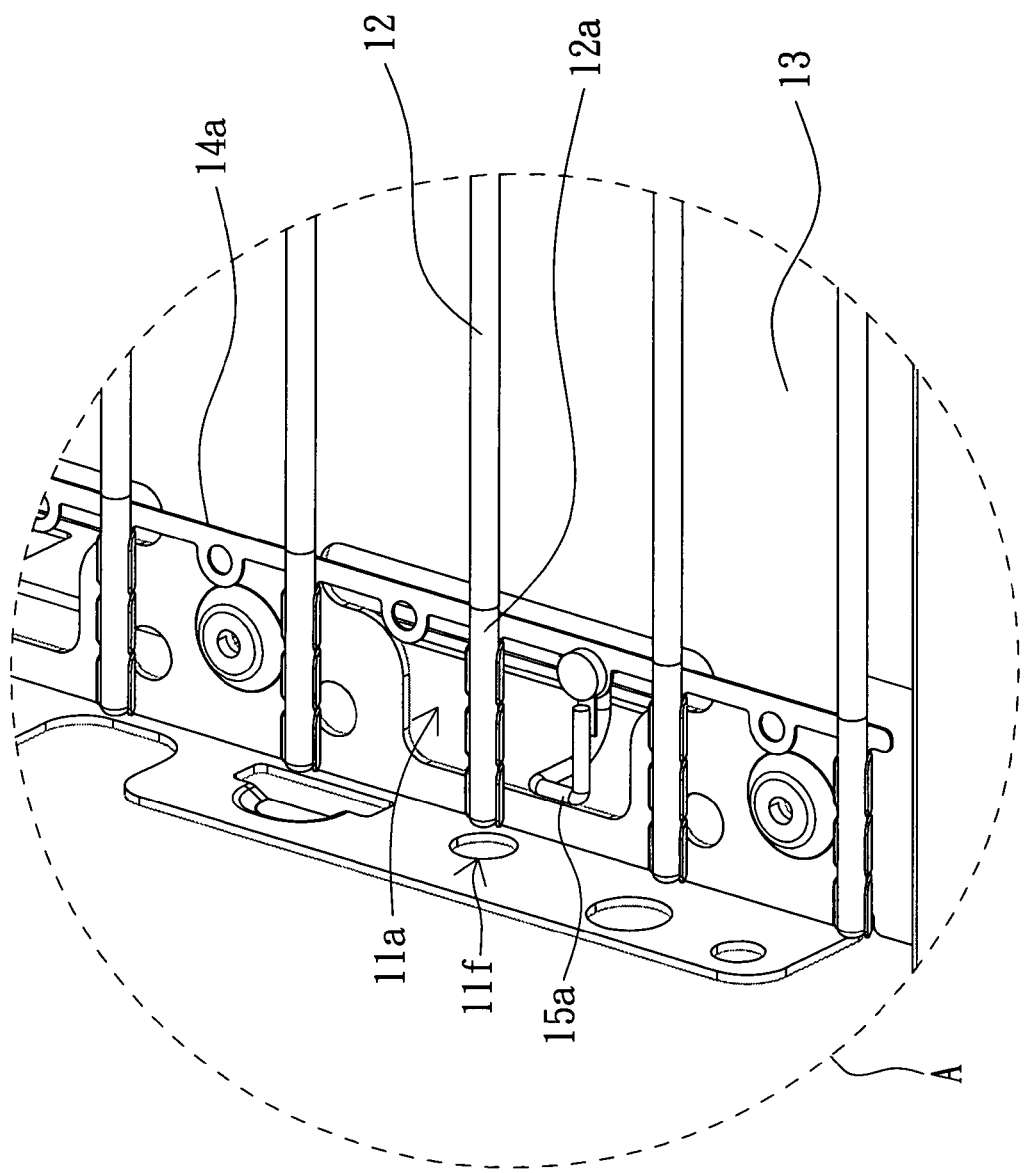
FIG. 2B is an enlarged diagram of power line A of a backlight module of FIG. 2A.
Figure 2C:
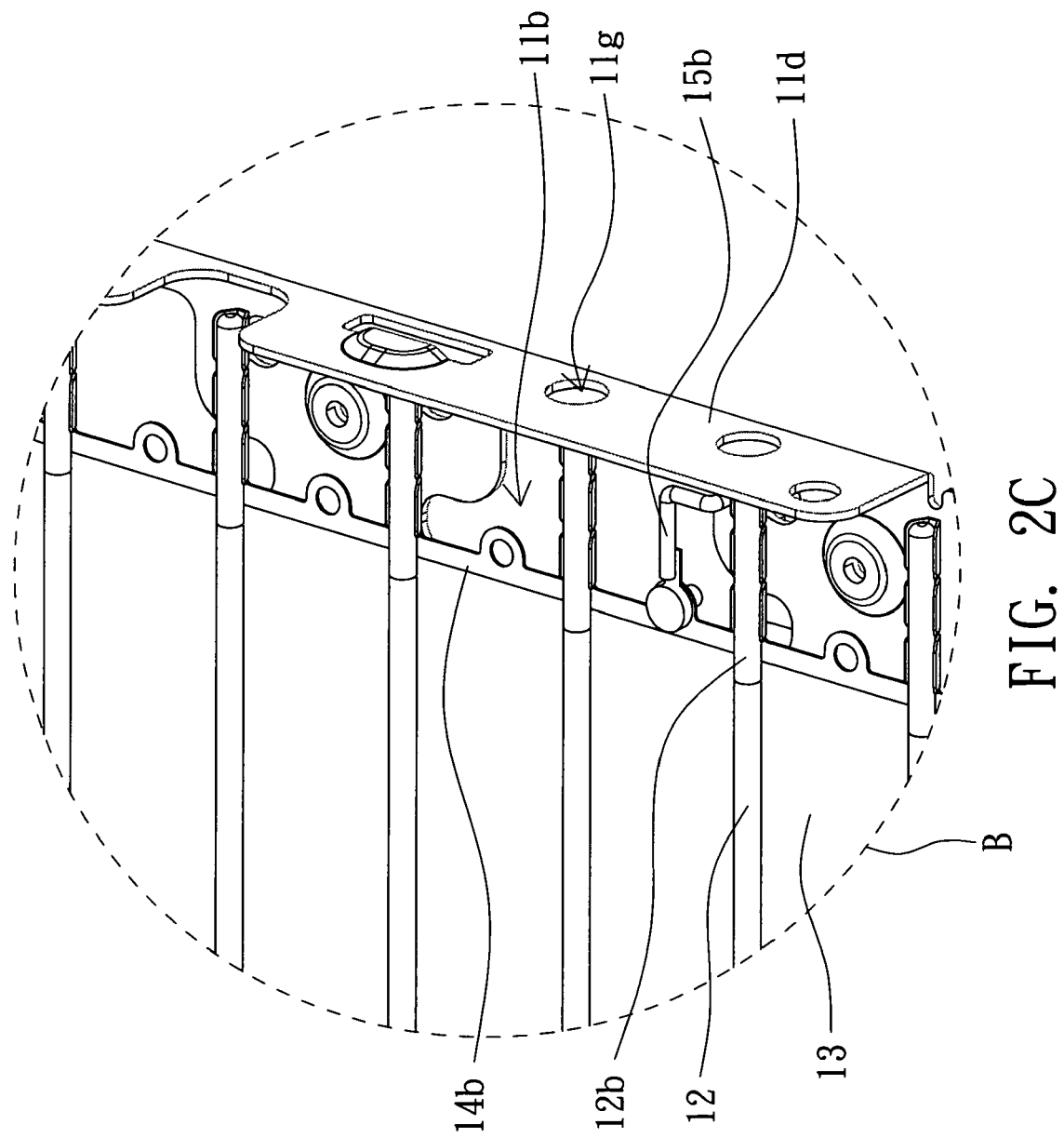
FIG. 2C is an enlarged diagram of power line B of a backlight module in FIG. 2A.

Referring to FIGS. 2A~2C, FIG. 2A is an enlarged 3-D top view of a backlight module of FIG. 1, FIG. 2B is an enlarged diagram of power line A of a backlight module of FIG. 2A, and FIG. 2C is an enlarged diagram of power line B of a backlight module in FIG. 2A. As shown in FIGS. 2A~2C, the light source 12 is exemplified by an EEFL of the linear light source, and the high voltage electrode terminals 12a and 12b of the light source 12 correspond to the two sides of the bottom plate 11c of the frame 11. The backlight module 10 further includes a number of light sources 12. The frame 11 further has a number of through apertures 11a, a number of through apertures 11b, a number of through apertures 11f and a number of through apertures 11g. The number of the through apertures 11a, 11b, 11f and 11g are determined according to the number of the high voltage electrode terminals of the light sources 12. The light sources 12 are disposed above the frame 11 in parallel along the X direction. The high voltage electrode terminals 12a of the light sources 12 are correspondingly positioned above the through apertures 11a, and the high voltage electrode terminals 12b of the light sources 12 are correspondingly positioned above the through apertures 11b. The high voltage electrode terminals 12a of the light sources 12 are correspondingly positioned to the right of the through apertures 11f, and the high voltage electrode terminals 12b of the light sources 12 are correspondingly positioned to the left of the through apertures 11g. In the present embodiment, part of the high voltage electrode terminals 12a of the light sources 12 are correspondingly positioned above the through apertures 11a and to the right of the through apertures 11f. Part of the high voltage electrode terminals 12b of the light sources 12 are correspondingly positioned above the through apertures 11b and to the right of the through apertures 11g.

Moreover, the high voltage electrode terminals 12a and 12b of each light source 12 can be correspondingly positioned above one through aperture 11a and one through aperture 11b. The high voltage electrode terminal 12a terminal 12a of each light source 12 is positioned to the right of the corresponding through aperture 11f, and the high voltage electrode terminal 12b of each light source 12 can be positioned to the left of the corresponding through aperture 11g.

Besides, the high voltage electrode terminals 12a and the high voltage electrode terminals 12b of two or more than two adjacent light sources 12 can be respectively positioned above one through aperture 11a and one through aperture 11b. The high voltage electrode terminals 12a of two or more than two adjacent light sources 12 can be positioned to the right of the corresponding through aperture 11f. The high voltage electrode terminals 12b of two or more than two adjacent light sources 12 can be positioned to the left of the corresponding through aperture 11g.

The electrical connection between the high voltage electrode terminals 12a and 12b of the light source 12 and the lamp inverter disposed under the bottom plate 11c is exemplified below. However, the technology of the present embodiment of the invention is not limited thereto. For example, in FIG. 2, the backlight module 10 can further include two conductive structures 14a and 14b and two power lines 15a and 15b. The light sources 12 are disposed in parallel above the frame 11 along the X direction. The conductive structures 14a and 14b are disposed above the bottom plate 11c along the Y direction, and are positioned in the boundary between the central region L and the marginal region P. The conductive structures 14a and 14b are respectively adjacent to the through apertures 11a and 11b to be electrically connected to the high voltage electrode terminals 12a and 12b of the light sources 12 respectively. The power line 15a passes through the through aperture 11a to electrically connect the conductive structure 14a disposed above the bottom plate 11c with the lamp inverter disposed under the bottom plate 11c. The power line 15b passes through the through aperture 11b to electrically connect the conductive structure 14b disposed above the bottom plate 11c with another lamp inverter or the same lamp inverter disposed under the bottom plate 11c.

Therefore, the lamp inverter can provide a voltage to the high voltage electrode terminal 12a of the light sources 12, another lamp inverter or the same lamp inverter via the power line 15a and the conductive structure 14a. Or, the lamp inverter can provide a voltage to the high voltage electrode terminal 12b of the light sources 12 via the power line 15b and the conductive structure 14b. Therefore, the light of the light source 12 can be projected to the LCD panel along the Z direction after having been reflected by the reflector 12.

However, anyone who is skilled in the technology of the present embodiment of the invention will understand that the technology of the present embodiment of the invention is not limited thereto. For example, the through apertures 11a and 11b can be of any shapes as long as the overlapped region of the frame 11 overlapped by the high voltage electrode terminal of the light source can be hollowed to form appropriate shapes of the through aperture 11a and 11b in matching with the space design of the electronic parts such as electronic parts such as lamp inverter and circuit board for instance, the power lines 15a and 15b or the conductive structures 14a and 14b in the proximity of the marginal region P.

The sizes of the through apertures 11a and 11b can respectively be equal to or larger than the areas of the projection of the high voltage electrode terminals 12a and 12b of the light source 12 on the bottom plate 11c of the frame 11. The sizes of the through aperture 11f and 11g can respectively be equal to or larger than the areas of the projection of the high voltage electrode terminals 12a and 12b of the light source 12 on the side plate 11d of the frame 11. Besides, the frame 11 can be made of metals or metal alloys. Moreover, the backlight module 10 can further include a diffuser and an optical film. The diffuser is disposed above the light source 12. The optical film is disposed above the diffuser. The optical film includes a prism, a diffuser or a brightness enhancement film.

Figure 3:
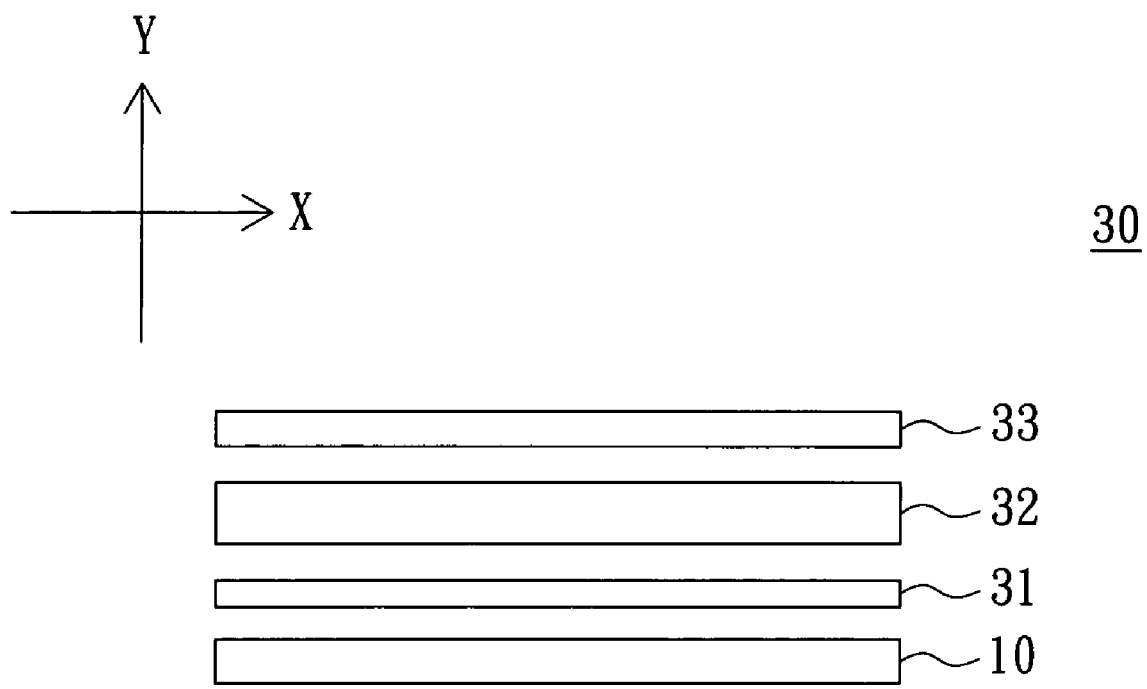
FIG. 3 is a diagram of an LCD device incorporating a backlight module of FIG. 1.

Referring to FIG. 3, a diagram of an LCD device incorporating a backlight module of FIG. 1 is shown. As shown in FIG. 3, the LCD device 30 includes the backlight module 10, two polarizers 31 and 33 and an LCD panel 32. The two polarizers 31 and 33 are disposed above the backlight module 10. The LCD panel 32 is disposed between the two polarizers 31 and 33. Besides, the light-transmission line of the polarizers 31 and 33 are substantially perpendicular to each other. Furthermore, the LCD device 30 can be applied in electronic products such as computer monitor, flat TV, monitor, pocket PC TV, mobile phone, handheld game device, digital camera (DC), digital video (DV), digital audio device, personal digital assistant (PDA), webpad, notebook, palm-top computer, lap-top computer, Table PC.

With the design of hollowing the overlapped region of the frame overlapped by the high voltage electrode terminal of the light source to form a through aperture, the backlight module and the liquid crystal display (LCD) device incorporating the same disclosed in the above embodiments of the invention reduce the parasitic capacitance between the high voltage electrode terminal of the light source and the frame as well as the leakage current between the high voltage electrode terminal of the light source and the frame. The design not only increases the luminance efficiency of the light source, but also increases the stability of the voltage of the light source provided by lamp inverter. Thus, the luminance quality of the backlight module is enhanced, and the practicality of the application of the LCD device of the backlight module is largely increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
    a frame having a bottom plate and a side plate, wherein the bottom plate has at least one first through aperture, and the side plate has at least one second through aperture whose aperture direction is substantially vertical to the aperture direction of the at least one first through aperture;
    at least one light source having at least one high voltage electrode terminal disposed above the frame, wherein the at least one light source is an external electrode fluorescent lamp, the at least one high voltage electrode terminal is positioned right above the at least one first through aperture and corresponds to the at least one second through aperture, and a bottom surface of the high voltage electrode terminal faces the at least one first through aperture; and
    at least one conductive structure disposed above the bottom plate and electrically connected to the at least one high voltage terminal, wherein the bottom plate has a central region and a marginal region, the at least one first through aperture is located in the marginal region, and the at least one conductive structure is positioned in a boundary between the central region and the marginal region.

2. The backlight module according to claim 1, comprising a plurality of the light sources, wherein the bottom plate has a plurality of the first through apertures, and the high voltage electrode terminals of the light sources are correspondingly positioned above the at least one first through apertures.

3. The backlight module according to claim 1, wherein the light source has two high voltage electrode terminals, the bottom plate has two first through apertures, and the two high voltage electrode terminals are correspondingly positioned above the two first through apertures.

4. The backlight module according to claim 1, wherein the backlight module further comprises:
    a reflector disposed on the central region and positioned under the light source.

5. The backlight module according to claim 1, wherein an end surface of the high voltage electrode terminal faces the at least one second through aperture.

6. A liquid crystal display (LCD) device, comprising:
    a backlight module, comprising:
        a frame having a bottom plate and a side plate, wherein the bottom plate has at least one first through aperture, and the side plate has at least one second through aperture whose aperture direction is substantially vertical to the aperture direction of the at least one first through aperture;
        at least one light source having at least one high voltage electrode terminal disposed above the frame and, wherein the at least one light source is an external electrode fluorescent lamp, the at least one high voltage electrode terminal is positioned right above the at least one first through aperture and corresponds to the at least one second through aperture, and a bottom surface of the high voltage electrode terminal faces the at least one first through aperture; and
        at least one conductive structure disposed above the bottom plate and electrically connected to the at least one high voltage terminal, wherein the bottom plate has a central region and a marginal region, the at least one first through aperture is located in the marginal region, and the at least one conductive structure is positioned in a boundary between the central region and the marginal region;
    two polarizers disposed above the backlight module; and
    an LCD panel disposed between the two polarizers.

7. The LCD device according to claim 6, wherein the backlight module comprises a plurality of the light sources, the bottom plate has a plurality of the first through apertures, and the high voltage electrode terminals of the light sources are correspondingly positioned above the at least one first through apertures.

8. The LCD device according to claim 6, wherein the light source has the high voltage electrode terminals, the bottom plate has two first through apertures, and the two high voltage electrode terminals are correspondingly positioned above the two first through apertures.

9. The LCD device according to claim 6, wherein the backlight module further comprises:
    a reflector disposed on the central region and positioned under the light source.

10. The LCD device according to claim 6, wherein an end surface of the high voltage electrode terminal faces the at least one second through aperture.

11. The backlight module according to claim 1, further comprising at least one power line, wherein the least one power line passes through the at least one first through aperture to electrically connect the at least one conductive structure.

12. The LCD device according to claim 6, wherein the backlight module further comprises at least one power line passing through the at least one first through aperture to electrically connect the at least one conductive structure.

* * * * *